United States Patent
Gjokaj

(10) Patent No.: US 8,121,471 B1
(45) Date of Patent: Feb. 21, 2012

(54) FOCUSING SYSTEM FOR MOTION PICTURE CAMERA

(76) Inventor: Enver Gjokaj, West Hollywood, CA (US)

( * ) Notice: Subject to any disclaimer, the term of this patent is extended or adjusted under 35 U.S.C. 154(b) by 0 days.

(21) Appl. No.: 12/900,910

(22) Filed: Oct. 8, 2010

(51) Int. Cl.
*G03B 13/34* (2006.01)

(52) U.S. Cl. ......................................... 396/131; 348/141

(58) Field of Classification Search .................. 396/131, 396/322, 333, 334; 348/141
See application file for complete search history.

(56) References Cited

U.S. PATENT DOCUMENTS

| | | |
|---|---|---|
| 4,002,899 A | 1/1977 | Stauffer |
| 4,093,365 A | 6/1978 | Isono |
| 4,240,727 A | 12/1980 | Lermann et al. |
| 4,265,528 A | 5/1981 | Bestenreiner et al. |
| 5,076,686 A | 12/1991 | Preston |
| 5,092,670 A | 3/1992 | Preston |
| 5,142,642 A * | 8/1992 | Sudo ................................ 348/47 |
| 6,160,607 A | 12/2000 | Diaconu |
| 2010/0201812 A1 * | 8/2010 | McGibney et al. ........... 348/143 |
| 2011/0122257 A1 * | 5/2011 | Kirk ............................... 348/187 |

* cited by examiner

*Primary Examiner* — Christopher Mahoney
*Assistant Examiner* — Linda B Smith
(74) *Attorney, Agent, or Firm* — Blakely Sokoloff Taylor & Zafman LLP

(57) ABSTRACT

A camera focusing system employs left and right video cameras flanking a principal photographic camera. The video cameras are coupled to respective video monitors, each of which has a vertical cursor line superimposed in the middle of the screen representing 90°. A cursor controller allows this line to be moved left and right. As the line is moved left or right to track a desired point of focus on the camera subject, the value increases or decreases from 90°. Software interprets the cursor displacement and determines a real world angular value based on calibration of the focusing system. The angular values are then used to compute the focal distance between the principal camera and the subject. Other embodiments are also described and claimed.

12 Claims, 4 Drawing Sheets

FOCUSING SYSTEM FOR MOTION PICTURE CAMERA

BACKGROUND

1. Field

An embodiment of the invention relates generally to the field of photography and, more particularly, to a system for automating the focus control of a film or video camera.

2. Background

Maintaining a properly focused image is critically important in film and television productions. This task is complicated by the fact that many shots require a moving object to be kept in focus or require different objects at different distances from the camera to be in focus at different times during the shot. Before a shot, the person responsible for focusing the camera typically prepares for the shot by carefully measuring the distance to each object that is to be in focus during the shot. These distances are then recorded for use during the shot, such as by marking the focusing ring on the camera lens with the measured distances. During the shot, a "focus puller" adjusts the focusing ring to bring each object into precise focus at the desired time. This method obviously relies on the skill of the focus puller. It is difficult enough to maintain proper focus with stationary objects. If the camera or the subjects to be photographed are moving, it becomes even more difficult to maintain the proper focus. Furthermore, this method is time consuming since careful measurements must be taken and recorded before each shot. While this is being done, the cast and the rest of the production crew must often remain idle. There is a need, therefore, for a method and apparatus for automating the camera focusing process.

SUMMARY

An embodiment of the present invention provides a camera focusing system with left and right video cameras flanking the principal photographic camera. The video cameras are coupled to respective video monitors, each of which has a vertical cursor line superimposed in the middle of the screen representing 90°. A cursor controller allows this line to be moved left and right. As the line is moved left or right to track a desired point of focus on the camera subject, the value increases or decreases from 90°. Software interprets the cursor displacement and determines a real world angular value based on calibration of the focusing system. The angular values are then used to compute the focal distance between the principal camera and the subject. Other embodiments are also described.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

DETAILED DESCRIPTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
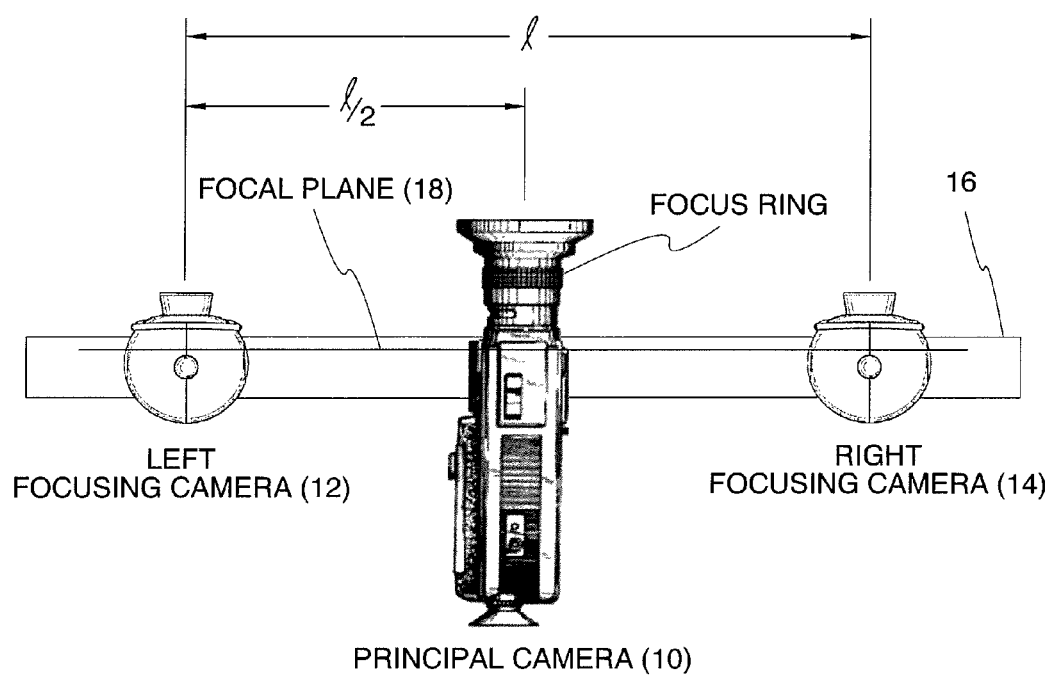
FIG. 1 is a top plan view of a portion of a camera focusing system in accordance with an embodiment of the present invention.

FIG. 1 is an overhead view of an apparatus in accordance with an embodiment of the present invention. Principal camera 10, which may be a film or video camera, is secured to a structural support 16. Left focusing camera 12 and right focusing camera 14 are video cameras that are also secured to structural support 16 on either side of and equidistant from the principal camera. The distance separating camera 12 from camera 14 is designated l, which can be measured with great precision. Each of cameras 12 and 14 is thus separated from principal camera 10 by a distance l/2. All three cameras are mounted so that the optical axes of their lenses are parallel and their respective focal planes lie within a common plane 18.

Figure 2:
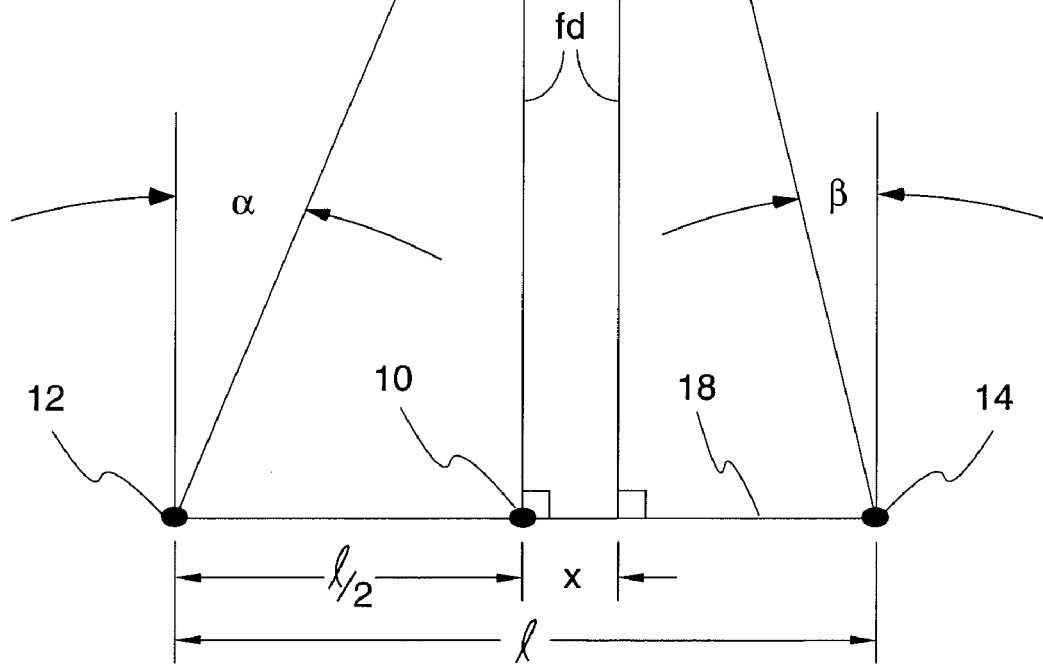
FIG. 2 diagrammatically illustrates certain linear and angular relationships of the focusing system.

Referring now to FIG. 2, the linear and angular relationships between the principal camera, the focusing cameras and a subject to be photographed are illustrated diagrammatically. The focal distance, fd, is the distance between the focal plane 18 of the cameras and a parallel plane 20 passing through the subject, or portion thereof, that is the desired point of focus. In the case illustrated here, the desired point of focus is the subject's eyes.

A line from left focusing camera 12 to the point of focus forms an angle $\alpha$ relative to the optical axis of camera 12. Similarly, a line from right focusing camera 14 to the point of focus forms an angle $\beta$ relative to the optical axis of camera 14. From the diagram, it can be seen that:

$$\tan \alpha = (l/2 + x)/fd$$

and $$\tan \beta = (l/2 - x)/fd$$

Summing these two equations yields:

$$\tan \alpha + \tan \beta = l/fd$$

And thus:

$$fd = l/(\tan \alpha + \tan \beta)$$

Figure 3:
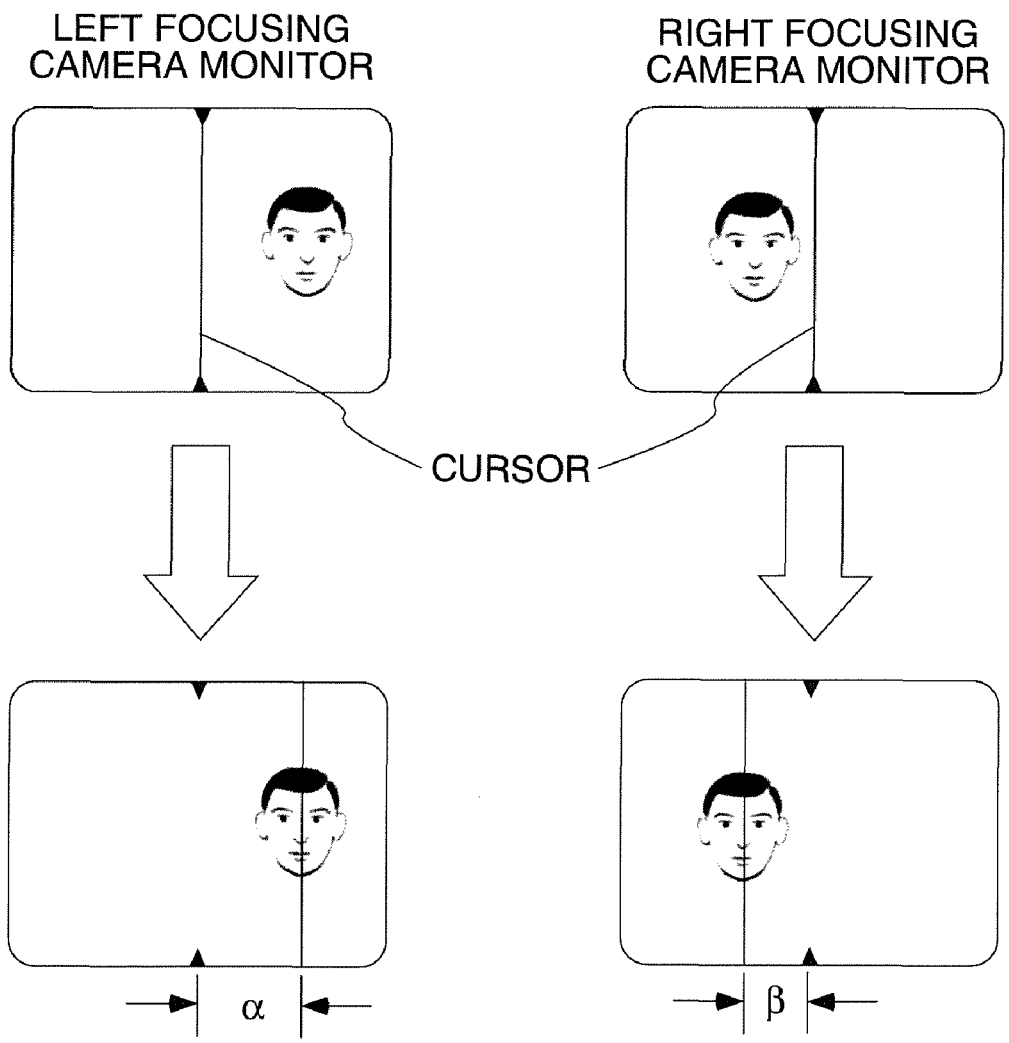
FIG. 3 illustrates operator control of focusing cursors utilized in an embodiment of the present invention.

FIG. 3 illustrates a method for determining the values of $\alpha$ and $\beta$. Left and right focusing cameras 12 and 14 each feed a video signal to a video monitor. Each camera may have a dedicated video monitor. Alternatively, a single video monitor may display the video signals from both cameras on a split screen or the signal from either camera may be selected for individual display with an operator-controlled switch.

A cursor is superimposed on the video signal from each of the focusing cameras. The cursor is moved by operator control, such as a simple scroll wheel or toggle stick, to lie over the desired point of focus on the video image of the subject. The two cameras and their respective monitors and cursor controllers can be operated by one person or even two for more accuracy. The displacement of the cursor from the center points of the monitors (i.e., aligned with the optical axis of the respective camera) provides a measure of the angular displacements $\alpha$ and $\beta$. The transformation of the cursor displacement to angular displacement is readily determined with a calibration procedure. Since the value of l is known, once the values of $\alpha$ and $\beta$ are determined, the focal distance, fd, can be easily computed with the above equation.

Figure 4:
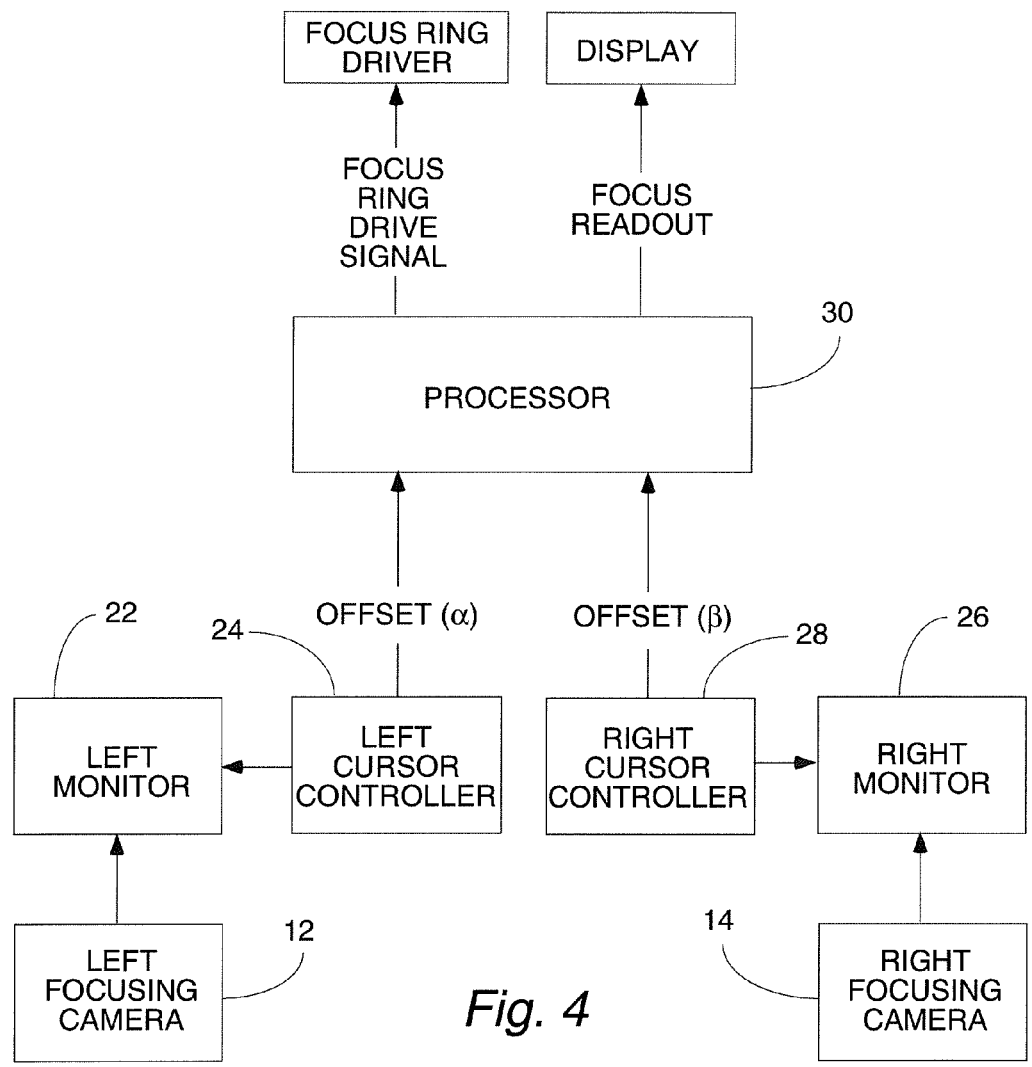
FIG. 4 is a functional block diagram of a camera focusing system in accordance with an embodiment of the present invention.

FIG. 4 is a block diagram of a system for implementing an embodiment of the present invention. As previously described, the video signal from left focusing camera 12 is fed to a left monitor 22 and the video signal from right focusing camera 14 is fed to a right monitor 26. As explained, an alternative embodiment of the invention may use a single video monitor to display the video signals from both cameras.

Left cursor controller 24 superimposes a cursor on left monitor 22, which can be moved left and right under operator control. Similarly, right cursor controller 28 superimposes a cursor on right monitor 26, which can also be moved left and right under operator control. The cursor displacements from center, representing the angular displacements $\alpha$ and $\beta$, are sent to processor 30, in which the value of l is stored. Processor 20 then calculates the focal distance, fd, using the equation given above. The processor provides a focus ring drive output signal to turn the focus ring of principal camera 10 with a servo-controlled stepper motor or similar mechanism. Alternatively, or in addition, the processor may output a focus readout signal that may be used to present a numerical display of the focal distance.

Although cursor controllers 24 and 28 are illustrated as functional blocks external to processor 30, it will be understood that the cursor control functions may, if desired, be implemented with software executed by processor 30.

Every camera lens has a unique focal length, aperture and throw to the lens ring. For example, changing the focal length on one lens ring from 1 foot to 10 feet may be a tiny adjustment, yet on another lens it may require a very large adjustment. For that matter, focal length is not constant, but curves toward infinity the further the subject gets from the camera. To compensate for this, the focusing system must be calibrated before use with the principal camera 10.

To do this, the camera 10 will be focused at different distances and the curve of the focal length will be plotted. This may be done by setting up targets in front of the camera at known distances. The number of targets necessary to properly calibrate a lens will depend on the particular characteristics of the lens. Some lenses may be calibrated with as few as three target points, whereas others may require targets placed every six inches or so. The operator would manually focus on each target and enter the corresponding distance into processor 30. With this information, software executed by the processor can calibrate the focus ring drive output signal so that a motor controlling the focus ring of camera 10 can be turned accurately to the desired focal distance.

It will be apparent from this description that aspects of the present invention may be embodied, at least in part, in software, hardware, firmware, or in combination thereof. That is, the techniques may be carried out in a computer system or other data processing system in response to its processor, such as a microprocessor, executing sequences of instructions contained in a memory, such as ROM, volatile RAM, non-volatile memory, cache, or a remote storage device. In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize that what is meant by such expressions is that the functions result from execution of code by a processor, such as a microprocessor.

A machine readable medium can be used to store software and data which when executed by the data processing system causes the system to perform various methods of the present invention. This executable software and data may be stored in various places including for example ROM, volatile RAM, non-volatile memory, and/or cache. Portions of this software and/or data may be stored in any one of these storage devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium. A machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media such as, but not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

Throughout the foregoing specification, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to bring about such a feature, structure, or characteristic in connection with other embodiments whether or not explicitly described. Various changes may be made in the structure and embodiments shown herein without departing from the principles of the invention. Further, features of the embodiments shown in various figures may be employed in combination with embodiments shown in other figures.

In the description as set forth above and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed description as set forth above are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion as set forth above, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer system or other apparatus. Various general purpose systems may be used with programs in accordance with the teachings herein, or it may prove convenient to construct more specialized apparatuses to perform the method operations. The structure for a variety of these systems appears from the description above. In addition, the invention is not described with reference to any particular programming language. It will be appreciated that a variety of programming languages may be used to implement the teachings of the invention as described herein.

Embodiments of the invention may include various operations as set forth above or fewer operations or more operations or operations in an order that is different from the order described herein. The operations may be embodied in machine-executable instructions that cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims that follow as well as the legal equivalents thereof.

What is claimed is:

1. An apparatus comprising:
   first and second video cameras;
   a mounting structure configured to secure the first and second video cameras in a spaced apart relationship and further configured to secure a principal camera equidistant between the first and second video cameras;
   at least one video monitor coupled to at least one of the first and second video cameras;
   at least one cursor controller for positioning a cursor on said at least one video monitor;
   a processor receiving first and second cursor position signals corresponding to a subject's position in a field of view of the first and second video cameras, respectively, and providing an output in response thereto representing a focal distance between the principal camera and the subject.

2. The apparatus of claim 1 comprising first and second video monitors coupled to the first and second video camera, respectively.

3. The apparatus of claim 2 comprising first and second cursor controllers for positioning cursors on the first and second video monitors, respectively.

4. The apparatus of claim 1 wherein the mounting structure is configured to secure the first and second video cameras and the principal camera such that their respective focal planes are coplanar.

5. The apparatus of claim 1 wherein the output is coupled to a numerical display.

6. The apparatus of claim 1 wherein the output is coupled to a focusing mechanism attached to a lens of the principal camera.

7. A method of determining a focal distance between a principal camera and a subject comprising:
   mounting first and second video cameras equidistant from a principal camera;
   displaying video signals from the first and second video cameras on at least one video monitor;
   providing at least one cursor controller for positioning a cursor on said at least one video monitor;
   acquiring first and second cursor position signals corresponding to a subject's position in a field of view of the first and second video cameras, respectively;
   computing a focal distance between the principal camera and the subject based on the first and second cursor position signals.

8. The method of claim 7 wherein video signals from the first and second video cameras are displayed on first and second video monitors, respectively.

9. The method of claim 8 wherein first and second cursor controllers are provided for positioning cursors on the first and second video monitors, respectively.

10. The method of claim 7 wherein the first and second video cameras are mounted such that respective focal planes of the first and second video cameras and the principal camera are coplanar.

11. The method of claim 7 further comprising displaying the focal distance as a numerical value.

12. The method of claim 7 further comprising sending the focal distance to a focusing mechanism attached to a lens of the principal camera.

* * * * *